United States Patent
Kato et al.

(10) Patent No.: US 6,505,496 B2
(45) Date of Patent: Jan. 14, 2003

(54) DRIVER ACTUATED ACCELERATOR MECHANISM WITH ACCELERATOR OPENING SENSOR

(75) Inventors: Yasunari Kato, Toyoake (JP); Takahiro Tamura, Toyohashi (JP); Katsumi Watanabe, Kariya (JP); Masahiro Makino, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 5 days.

(21) Appl. No.: 09/736,362

(22) Filed: Dec. 15, 2000

(65) Prior Publication Data

US 2001/0007206 A1 Jul. 12, 2001

(30) Foreign Application Priority Data

Dec. 15, 1999 (JP) .............................................. 11-355746
Jul. 28, 2000 (JP) ........................................ 2000-229892

(51) Int. Cl.⁷ .............................................. G01P 13/00
(52) U.S. Cl. .......................... 73/1.79; 73/118.1; 73/132
(58) Field of Search ................................ 73/1.01, 1.75, 73/1.79, 116, 118.1, 121, 132

(56) References Cited

U.S. PATENT DOCUMENTS

| | | | |
|---|---|---|---|
| 4,703,649 A | | 11/1987 | Eitoku et al. |
| 5,060,744 A | * | 10/1991 | Katoh et al. ................ 123/361 |
| 5,529,296 A | * | 6/1996 | Kato et al. .................. 267/155 |
| 5,544,000 A | * | 8/1996 | Suzuki et al. ............ 324/207.2 |
| 5,567,874 A | * | 10/1996 | Suzuki et al. .............. 73/118.2 |
| 5,571,960 A | * | 11/1996 | Tateishi et al. ............ 123/337 |
| 6,019,016 A | * | 2/2000 | Takagi et al. .............. 123/399 |

FOREIGN PATENT DOCUMENTS

| | | |
|---|---|---|
| JP | 10-287147 | 10/1998 |
| JP | 11-59220 | 3/1999 |
| JP | 11-350988 | 12/1999 |

* cited by examiner

Primary Examiner—Eric S. McCall
(74) Attorney, Agent, or Firm—Nixon & Vanderhye PC

(57) ABSTRACT

A support shaft is non-rotationally inserted into bearing plates of support member. Accelerator rotor is attached to support shaft and can rotate, and a driver rotates it by means of the actuation of the accelerator pedal. Sensor rotor of accelerator opening sensor is attached to support shaft and can rotate. Protruding portion of sensor rotor is engaged with recess portion formed in accelerator rotor. Because plate spring inserted into recess portion sandwiches protruding portion in a direction opposite of the direction of rotation, with respect to sensor rotor, shift or deviation in the direction of rotation of accelerator rotor is prevented. Further, with respect to sensor rotor, accelerator rotor can slide in contact with plate spring while sliding in the direction of support shaft and the radial direction of accelerator rotor.

17 Claims, 9 Drawing Sheets

DRIVER ACTUATED ACCELERATOR MECHANISM WITH ACCELERATOR OPENING SENSOR

CROSS-REFERENCE TO RELATED APPLICATION

The present invention is related to Japanese patent application No. Hei. 11-355746, filed Dec. 15, 1999; 2000-229892, filed Jul. 28, 2000, the contents of which are incorporated herein by reference.

FIELD OF THE INVENTION

The present invention generally relates to an accelerator device, and more particularly, to an accelerator device in which both the axis of rotation of an accelerator member and the axis of rotation of an accelerator opening sensor rotate about the same axis.

BACKGROUND OF THE INVENTION

Previously, an accelerator device equipped with an accelerator opening sensor was disclosed in Japanese published unexamined patent applications Heisei 10-287147 and Heisei. 11-59220. An accelerator device is used by a driver to control the engine by means of a accelerator pedal depressed by the driver's foot or the like.

The accelerator opening sensor detects the amount of force applied to the accelerator pedal, i.e., the accelerator pedal's angle of rotation or, in other words, the degree of accelerator opening. The degree of accelerator opening is used as control information and the like by the throttle device. The sensor disclosed in Japanese published unexamined utility model application Showa 62-97909 can be used as an accelerator opening sensor. Here, a contact member on the sensor rotor of an accelerator opening sensor contacts with a substrate coated with a resistor. When the angle of rotation of the sensor rotor changes by actuation of the accelerator, the position of the contact member and the resistor changes, and the value of the voltage output changes. The degree of accelerator opening can be detected by this change in voltage output.

In the accelerator device disclosed in Japanese published unexamined patent applications Heisei 10-287147 and Heisei 11-59220, the axis of rotation of the accelerator member having the accelerator pedal, and the axis of rotation of the sensor rotor of the accelerator opening sensor, are different. There are two axes. The level of pressing or accelerator actuation on the accelerator member is transmitted to the sensor rotor by means of the transmission member, and the amount of accelerator actuation is detected by the position of the rotation angle.

However, because there are different axes of rotation for the accelerator member and the sensor rotor, the axes of rotation must be aligned, and thus the number of parts increases. Consequently, the level of production complexity increases, and manufacturing costs climb. In addition, because there are two axes, the device becomes much larger. Furthermore, because the rotational movement of the acceleration member is transmitted to the axis of rotation of a different sensor rotor by means of a transmission member, the rate of change of the level of accelerator actuation and the rate of change of the sensor rotor are not the same, and errors are generated. Furthermore, if the position of the two axes accidentally shifts or deviates by warping in materials when the accelerator device is connected to an automobile chassis or the like, the degree of accelerator opening cannot be detected with a high degree of accuracy.

In order to eliminate these types of problems, rotating the accelerator member and the sensor rotor about the same axis of rotation has been considered. However, in an acceleration device in which these elements are rotated about the same axis, when the accelerator member slides due to a movement of the accelerator in other than a rotational direction, this shift or deviation is also created in the sensor rotor. When the sensor rotor slides, there is a danger that there will be poor contact between the contact member and a resistor and slide/contact type of sensor. Even with other types of sensor methods, there is the danger that a high degree of accuracy cannot be obtained there is shift or deviation in the sensor rotor.

SUMMARY OF THE INVENTION

The present invention provides a small accelerator device that detects the degree of accelerator opening with a high degree of accuracy. The present invention also provides an accelerator device that prevents the degree of accelerator opening from being fixed in the full open position, even if the recess portion and the protruding member inserted therein are damaged. In the present invention, both the accelerator rotor and sensor rotor rotate about a single support shaft that serves as an axis of rotation. Because one shaft serves as the axis of rotation, the accelerator device can be made small. In addition, compared to where the accelerator rotor and sensor rotor have different axes of rotation, alignment during assembly is easy. In addition, because the number of parts is reduced and assembly becomes easy, production costs are reduced. In addition, because the amount of actuation is transmitted from the accelerator rotor directly to the sensor rotor and not through a transmission member, the rate of change in the amount of accelerator actuation and the rate of change in the sensor rotor are consistent with one another. Thus, there are no transmission errors generated in the amount of accelerator actuation, and the degree of accelerator opening can be detected with a high degree of accuracy.

Furthermore, the support shaft does not rotate but is fixed to the support member, and the amount of accelerator actuation is transmitted to the sensor rotor due to the fact that the accelerator rotor and the sensor rotor are engaged with each other. Even if the accelerator rotor slides in a direction other than toward rotation due to accelerator actuation, the engaged configuration absorbs shift or deviation in the accelerator rotor, and thus the shift or deviation in the accelerator rotor is prevented from being transmitted to the sensor rotor, and the degree of accelerator opening can be detected with a high degree of accuracy.

The force applied to the sensor rotor in directions other than the direction of rotation by accelerator actuation can be broken down into the rotational direction, the support shaft direction, and the radial direction of the accelerator rotor.

In the accelerator device according to another aspect of the present invention, the accelerator rotor is prevented from shifting or deviating in the rotational direction with respect to the sensor rotor, and is engaged with the sensor rotor such that it slides in contact with it in the support shaft direction and in the radial direction of the accelerator rotor. When force is applied to the sensor rotor in a direction other than the rotational direction, even though the accelerator rotor slides in contact with the sensor rotor and the position shifts or deviates, the shift or deviation in the position of the accelerator rotor is not transmitted to the sensor rotor. Thus, the degree of accelerator opening can be detected with a high degree of accuracy.

However, it is difficult to both prevent the accelerator rotor from shifting or deviating in the direction of rotation with respect to the sensor rotor, and manufacture an engagement portion for the accelerator rotor and the sensor rotor such that the accelerator rotor and the sensor rotor slide in contact with each other in the support shaft direction and the radial direction of the accelerator rotor. In another aspect of the present invention, a plate spring is inserted into a recess portion formed in either the accelerator rotor or the sensor rotor, and a protruding portion formed in the accelerator rotor or sensor rotor not having the recess portion is engaged in the recess portion such that biasing force is received from the plate spring in the direction of rotation. Because the plate spring absorbs manufacturing errors, a high degree of manufacturing accuracy in the recess portion and the protruding portion is not necessary, and manufacturing becomes easy.

In another aspect of the present invention, more than 1 recess portion is formed in either the accelerator rotor or the sensor rotor, a plurality of protrusion portions are formed in the accelerator rotor or sensor rotor that do not have the recess portions and are engaged with the recess portions, at least one of the protruding portions receive biasing force in the rotational direction from a plate spring inserted into at least one of the recess portions and engaged with the recess portion. Even if a number of protruding portions are damaged, if at least one of the protruding portions remains undamaged, the engagement between the protruding portion and the recess portion can be maintained. Thus, the sensor rotor can be prevented from being suspended in the full open position.

In another aspect of the present invention, protruding portions are formed in the sensor rotor, and recess portions are formed in the accelerator rotor. Either at least one of the protruding members receives biasing force in the rotational direction from a plate spring inserted into the aforementioned recess portions, or at least one of the protruding members cannot move in the rotational direction in the engaged state with the recess portions that do not have a plate spring inserted therein, or if $\theta 1$ is defined as the rotational angle of the gap formed in the rotational direction between a protruding member and the accelerator closed end surface of the recess portion, $\theta 2$ is defined as the range of the angle of the rotational movement of the accelerator rotor, and $\theta 3$ is defined as the rotational angle between the protruding portion and the accelerator open end surface of the recess portions that do not have a plate spring inserted therein, $\theta 1$ is greater than $\theta 2$ and $\theta 2$ is greater than $\theta 3$. Even if the protruding portion biased in the direction of rotation by the plate spring is damaged, because $\theta 2$ is greater than $\theta 3$, even if the sensor rotor is in the fully open position, when the accelerator rotor returns to the fully closed position, the protruding portion not biased in the direction of rotation by the plate spring will be engaged by the accelerator open end surface, and the sensor rotor will rotate to the closed position from the fully open position.

In addition, because $\theta 1$ is greater than $\theta 2$, when the accelerator rotor returns to the fully closed position, the accelerator closed end surface of the recess portion and the protruding portion do not contact. Because the sensor rotor stops in a closed position from a fully open position, and in this closed position the accelerator opening sensor can fix the detected degree of accelerator opening, the degree of accelerator opening can prevent fixing in the fully open position. The accelerator opening sensor approaches the closed state due to the small size of $\theta 3$.

In another aspect of the present invention, a protruding portion is formed on the sensor rotor, a recess portion is formed on the accelerator rotor, and $\theta 1$ is greater than $\theta 2$, and $\theta 2$ is greater than $\theta 3$. Even if the protruding portion receiving biasing force from a plate spring in the direction of rotation is damaged, because $\theta 2$ is greater than $\theta 3$, even if the sensor rotor is in the fully open position, if the accelerator rotor returns to the fully closed position, the sensor rotor will rotate from the fully open position to the closed state. In addition, because $\theta 1$ is greater than $\theta 2$, when the accelerator rotor rotates from the fully closed position to the open state, the sensor rotor will rotate to the open position without reaching the range of the fully open position. In other words, while protecting against the degree of accelerator opening from reaching the fully open position, the degree of opening can be regulated by that range of degrees. The smallest degree of opening approaches the fully closed position due to the small size of $\theta 3$.

In another aspect of the present invention, protruding portions are formed on the accelerator rotor, and recess portions are formed in the sensor rotor. Either at least one of the protruding members receive biasing force in the rotational direction from a plate spring inserted into the recess portions, or at least one of said protruding members cannot move in the rotational direction in the engaged state with said recess portions that do not have a plate spring inserted therein. Or if $\theta 1$ is defined as the rotational angle of the gap formed in the rotational direction between said protruding member and the accelerator open end surface of the recess portion, $\theta 2$ is defined as the range of the angle of the rotational movement of said accelerator rotor, and $\theta 3$ is defined as the rotational angle between said protruding portion and the accelerator closed end surface of said recess portions that do not cave a plate spring inserted therein, then $\theta 1$ is less than $\theta 2$ and $\theta 2$ is greater than $\theta 3$.

In another aspect of the invention, a protruding portion is formed on the accelerator rotor, a recess portion is formed in the sensor rotor, and $\theta 1$ is less than $\theta 2$, and $\theta 2$ is greater than $\theta 3$.

In another aspect of the present invention, protruding portions are formed on the accelerator rotor, and recess portions are formed in the sensor rotor. Either at least one of the protruding members receive biasing force in the rotational direction from a plate spring inserted into the recess portions, or at least one of said protruding members cannot move in the rotational direction in the engaged state with said recess portions that do not have a plate spring inserted therein. Or if Theta 1 is defined as the rotational angle of the gap formed in the rotational direction between said protruding member and the accelerator open end surface of the recess portion, Theta 2 is defined as the range of the angle of the rotational movement of said accelerator rotor, and Theta 3 is defined as the rotational angle between said protruding portion and the accelerator closed end surface of said recess portions that do not have a plate spring inserted therein, then Theta 1 is less than Theta 2 and Theta 2 is greater than Theta 3.

In an accelerator device according to claim 8 of the present invention, a protruding portion is formed on the accelerator rotor, a recess portion is formed in the sensor rotor, and Theta 1 is less than Theta 2, and Theta 2 is greater than Theta 3.

In another aspect of the present invention, a tubular member is attached to the outer circumference of one support shaft non-rotationally fixed to a support member, and the tubular member is attached to an accelerator rotor and can rotate. A sensor rotor is attached to the support shaft and can rotate, and rotates together with the accelerator rotor. Because a sliding clearance is formed between the accelerator rotor and the tubular member, there is a danger of central axis shift or deviation in the accelerator rotor with respect to the tubular member. However, there is a cone-shaped concave surface in either the tubular member or the accelerator rotor, and a cone-shaped or pyramid-shaped convex surface formed in the tubular member or the accelerator rotor not having the cone-shaped concave surface. The cone-shaped or pyramid-shaped convex surface has a taper angle approximately the same as that of the cone-shaped concave surface, and in contact with each other in the support shaft direction. Then, because accelerator rotor is biased such that the central axis biasing means brings the cone-shaped concave surface and either the pyramid-shaped convex surface or the cone-shaped convex surface in contact with each other, the accelerator rotor receives centripetal force. Thus, shift or deviation in the central axis of the accelerator rotor is prevented.

In another aspect of the present invention, due to biasing of the sensor rotor in one direction of the support shaft, even though the accelerator rotor slides in the support shaft direction and the accelerator rotor and the sensor rotor slide in contact with each other, sensor rotor sliding due to sliding resistance in the support shaft direction is prevented.

In another aspect of the present invention, a sensor rotor is supported by a tapered surface formed in a support shaft, and the sensor rotor is prevented from movement in the support shaft direction and the orthogonal direction.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 2:
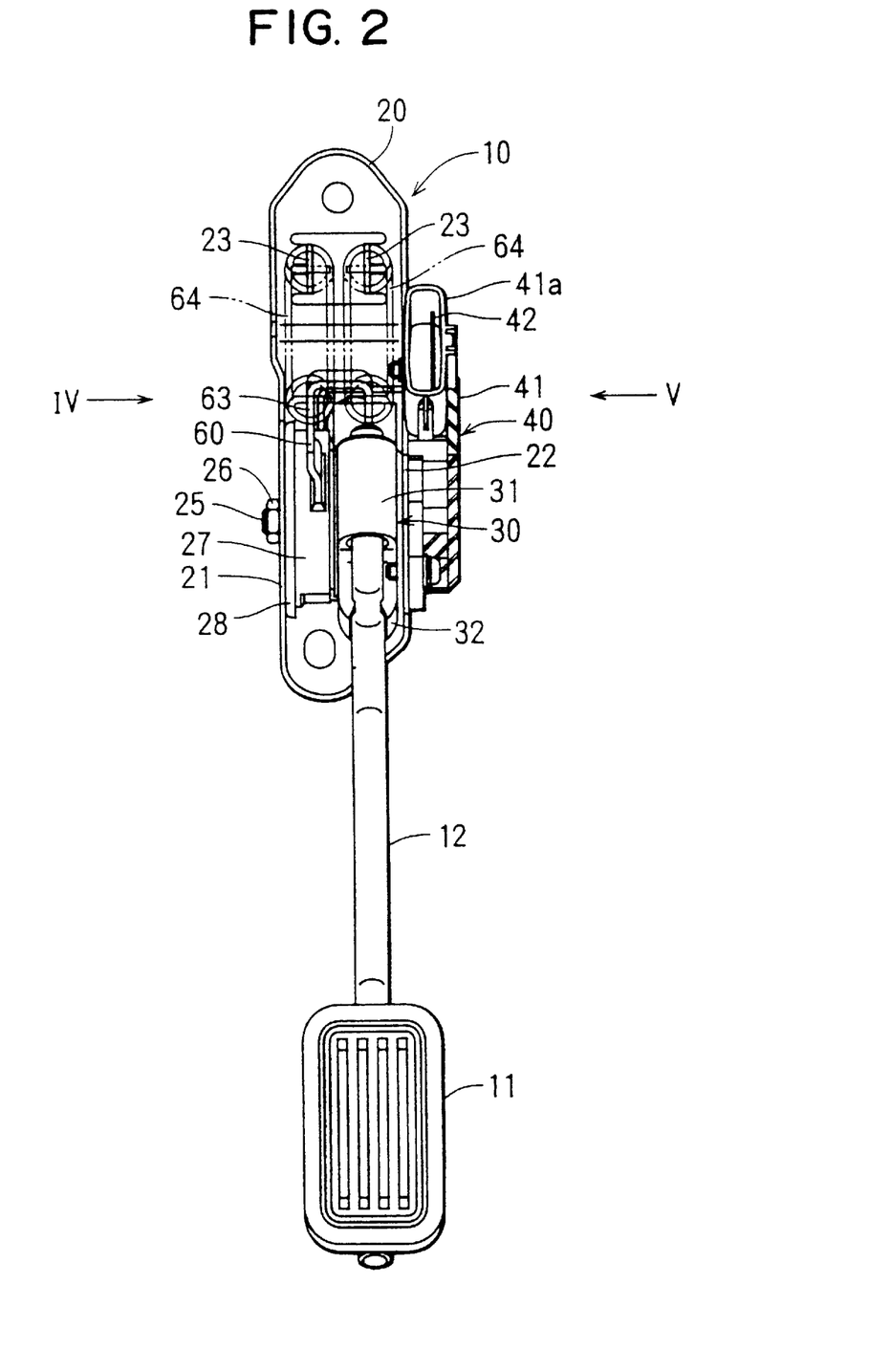
FIG. 2 is a plan view of the first embodiment of the accelerator device.

A first embodiment of the accelerator device is shown in FIG. 2. Based on the degree of accelerator opening detected by the accelerator opening sensor 40, the engine control device (not shown) (hereinafter referred to as "ECU") controls the degree of throttle opening.

Figure 3:
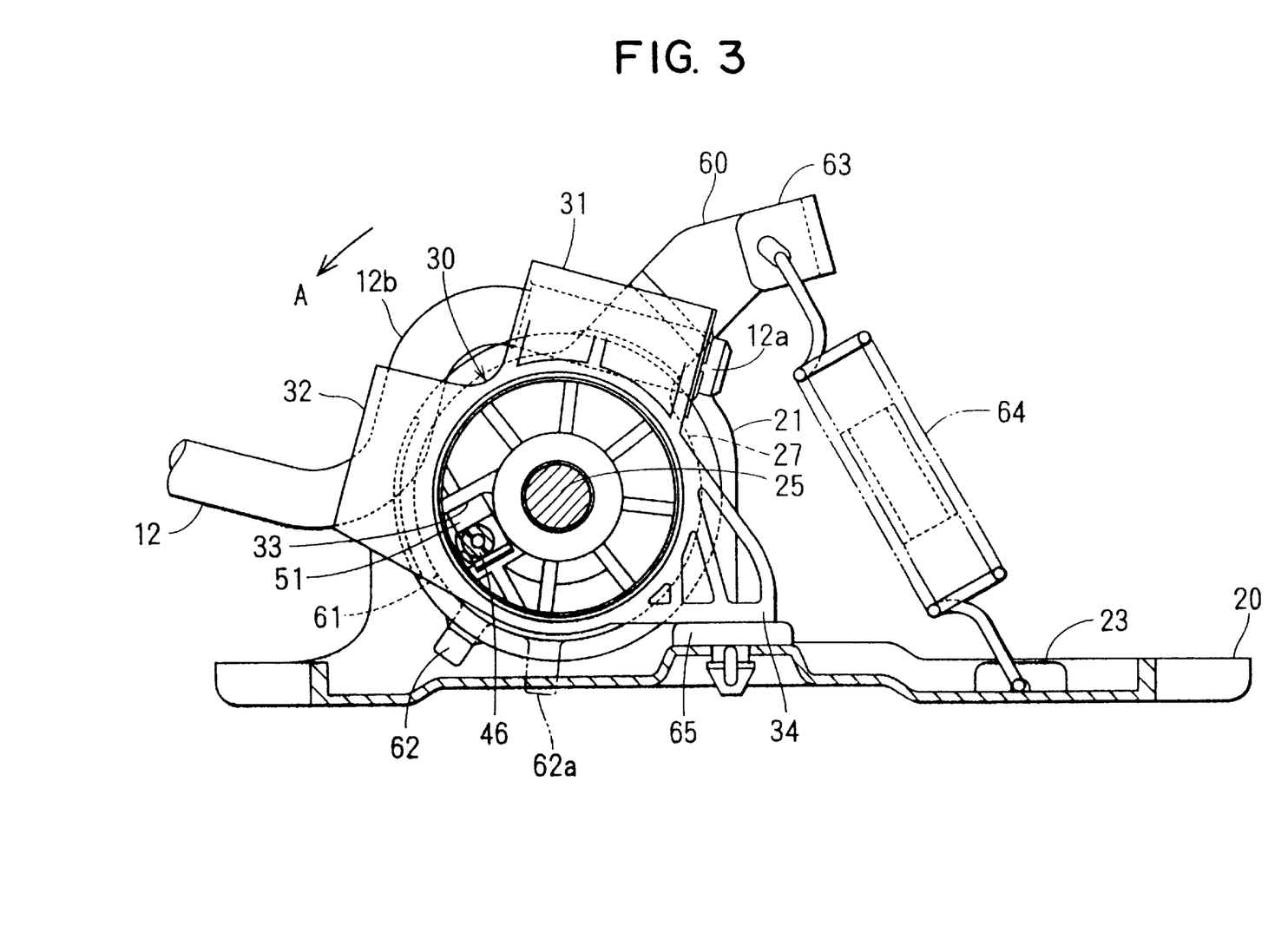
FIG. 3 is a cross-sectional view along line III—III of FIG. 1 of an accelerator device according to the present invention.

The accelerator device 10 is attached to an automobile chassis by means of support member 20 and bolts or the like. A driver actuates accelerator device 10 through an accelerator pedal 11 that is attached to a first end of pedal arm 12. Accelerator pedal 11 and pedal arm 12 constitute an accelerator member. An accelerator rotor 30 is attached to a second end of pedal arm 12. The accelerator rotor 30 rotates when the driver actuates the accelerator pedal 11. Support shaft 25 is inserted through bearing plates 21 and 22 on support member 20, and non-rotationally fixed thereto by means of nut 26. Lever rotor 27 is formed from a resin, and as shown in FIG. 3, is formed as an insert to the annular portion 61 of lever 60. Spring 64 serves as an accelerator biasing means, and a first end thereof is attached to arm portion 63 of lever 60. A second end of spring 64 is connected to connecting portion 23 formed on support member 20. A tab 62 is formed on the annular portion of lever 60. When a driver depresses accelerator pedal 11, the accelerator rotor 30 rotates together with lever rotor 27 and lever 60 in the direction A shown in FIG. 3. When tab 62 rotates to the position shown by the dotted lines in 62a, tab 62 is stopped by the connecting portion formed on support member 20.

Figure 1:
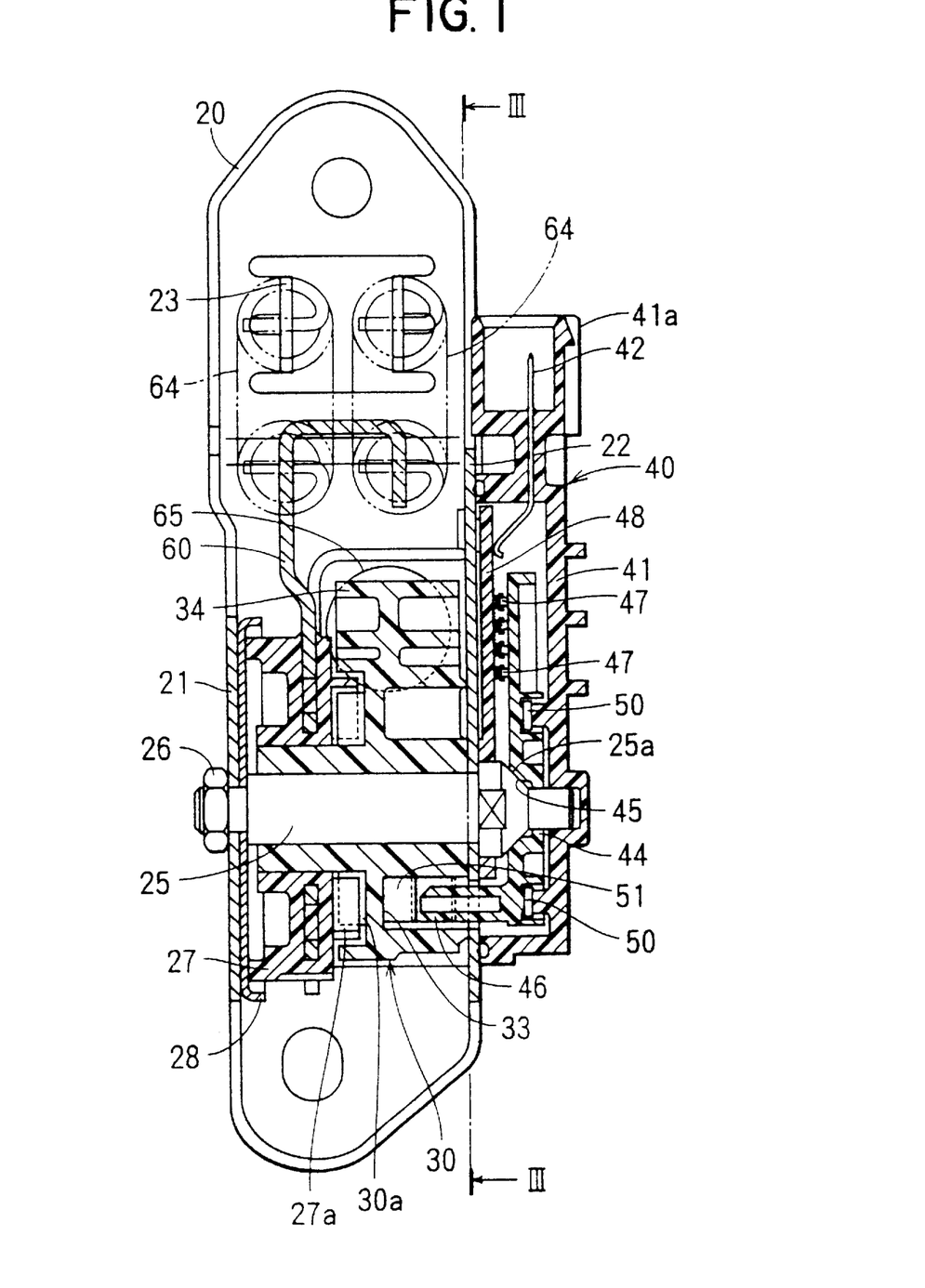
FIG. 1 is a cross-sectional view of an accelerator device according to a first embodiment of the present invention.

As shown in FIG. 1, diagonal teeth 27a and 30a are arranged on opposing faces of lever rotor 27 and accelerator rotor 30. Diagonal teeth 27a and diagonal teeth 30a engage with each other such that lever rotor 27 and accelerator rotor 30 can receive force in mutually separate directions by means of the biasing force of springs 64. Further, when accelerator pedal 11 is depressed and the biasing force of springs 64 is opposed, lever rotor 27 and accelerator rotor 30 receive force in mutually separate ways by means of the engagement of diagonal teeth 27a and diagonal teeth 30a. Washer plate 28 is sandwiched between lever rotor 27 and bearing plate 21. Washer plate 28 reduces the amount of abrasion on lever rotor 27 and bearing plate 21 when they slide against each other.

Figure 4:
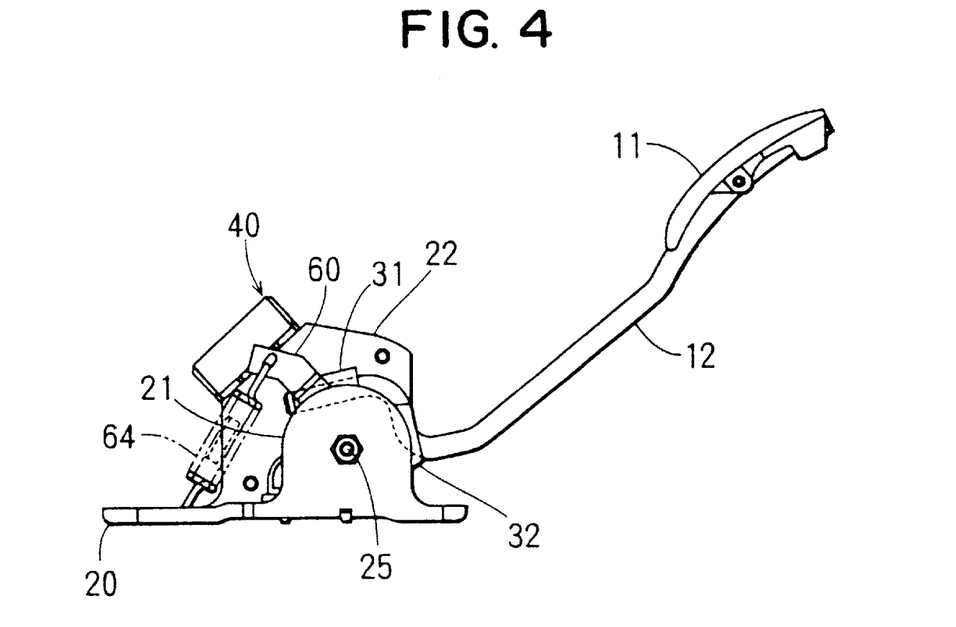
FIG. 4 is a plan view in the direction of line IV of FIG. 2 of an accelerator device according to the present invention.

Accelerator rotor 30 is formed from a resin. As is shown in FIG. 3 and FIG. 4, insert portion 31 and press-in portion 32 are disposed on the periphery of accelerator rotor 30 at approximately 90 degrees with respect to each other. Two approximately right angle bends have been made in the second end of pedal arm 12 (opposite the accelerator pedal). End portion 12a of pedal arm 12 is inserted into insert portion 31, and crooked portion 12b of pedal arm 12 is snap fitted into press-in portion 32. Stop 34 is formed on accelerator rotor 30, and contacts with stop member 65 formed on support member 20 when accelerator pedal 11 is not actuated.

Figure 5:
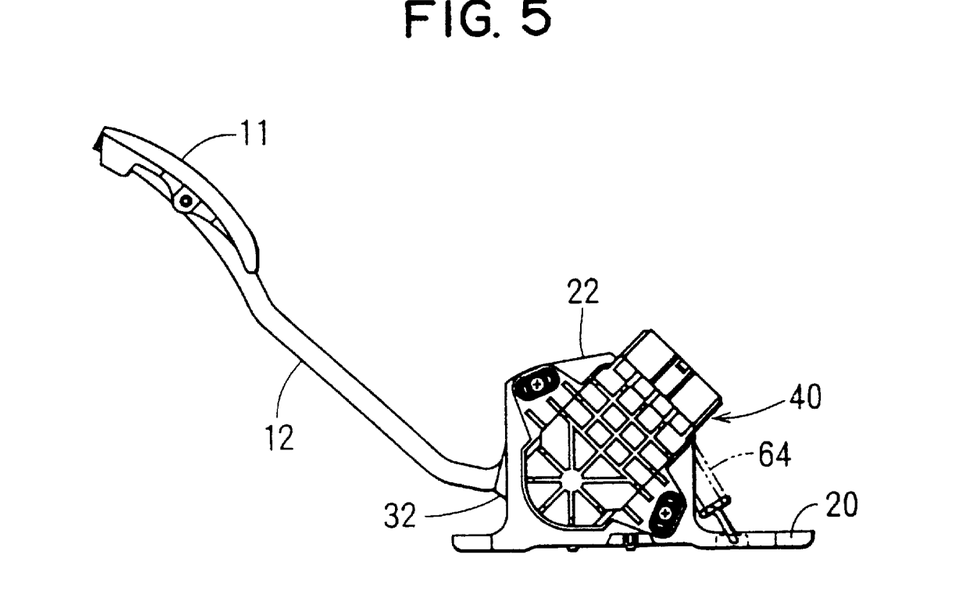
FIG. 5 is a plan view in the direction of line V of FIG. 2 of an accelerator device according to the present invention.

As shown in FIGS. 1 and 5, the accelerator opening sensor 40 is attached to the opposite side of bearing plate 22. Accelerator opening sensor 40 is composed of sensor rotor 44, contact portions 47 attached to sensor rotor 40, and substrate 48 that is coated with an electrical resistor. Substrate 48 is fixed to bearing plate 22 opposite sensor rotor 44. A constant 5V of electricity is applied to the resistor coated substrate 48. When the position of the contact portions and this resistor changes in response to the level of accelerator actuation, the level of output voltage changes. The accelerator opening sensor 40 inputs the change in the output voltage level to the ECU (not shown in the figures), and the degree of accelerator opening is detected.

Cover 41 is composed of a resin, and a plurality of terminals 42 are covered by connector portion 41 a formed in cover 41. Sensor rotor 44 is formed from a resin, and is supported by support shaft 25 and freely rotatable thereon. Plate spring 50 serves as a sensor biasing means, and biases sensor rotor 44 toward the accelerator rotor 30 side of support shaft 25. Because the tapered surfaces 45 formed in sensor rotor 44 are pushed toward the tapered surfaces 25a formed in support shaft 25a by means of the biasing force of plate spring 50, both surfaces slide in contact with each other. A protruding portion 46 is formed in the sensor rotor 44 in a position eccentric to support shaft 25, and fits into a recess portion 33 formed in accelerator rotor 30. The plate spring 51 is inserted into the recess portion 33, and the part which sandwiches protruding portion 46 in place is bent into a shape that resembles in cross-section the Japanese katakana letter (ko). Because plate spring 51 clamps protruding portion 46 by means of a biasing force that is opposite to that of the direction of rotation, shift or deviation with respect to the accelerator rotor 30 and sensor rotor 44 is prevented. Gaps are formed between the protruding portion 46 and the plate spring 51, and extend in both the direction of support shaft 25 and in the radial direction of accelerator rotor 30. Thus, with respect to the sensor rotor 44, the accelerator rotor 30 can remain in contact with the plate spring 51 while sliding toward the support shaft 25 and the radial direction of the accelerator rotor 30.

Next, the operation of accelerator device will be explained.

When a driver adjusts the amount of actuation on accelerator pedal 11, pedal arm 12 and accelerator rotor 30 rotate together. Because the diagonal teeth engage the accelerator rotor 30 and lever rotor 27, the rotation of the accelerator rotor 30 is transmitted by lever rotor 27 and the actuation of accelerator pedal 11, and the biasing force of springs 64 is transmitted from lever rotor 27 to accelerator rotor 30.

As mentioned above, diagonal teeth engage lever rotor 27 and accelerator rotor 30, and together receive force in separate directions. When accelerator pedal 11 is depressed, the biasing force of springs 64 and the sliding resistance generated when both rotors rotate act in a direction opposite of the pedal force applied to the accelerator pedal 11. When the accelerator pedal 11 returns, the sliding resistance acts in a direction opposite that of the biasing force of springs 64. Thus, both when accelerator pedal 11 is depressed, and when it returns, the amount of depression of accelerator pedal 11 and the force increase in the return direction of accelerator pedal 11 generates hysteresis. Thus, it is easy to maintain accelerator pedal 11 in a desired position.

Because protruding portion 46 of sensor rotor 44 is engaged with recess portion 33 of accelerator rotor 30, accelerator rotor 30 rotates together with sensor rotor 44. When the angle of rotation of sensor rotor 44 changes, the position of contact portions 47 and the resistor-coated substrate 48 changes, and the level of output voltage increases. The degree of accelerator opening can be detected by means of this voltage level.

Because a driver does not typically maintain accelerator pedal 11 in the direction of actuation but instead actuates it in various other directions, the direction of the increase in force in accelerator rotor 30 by means of the actuation of the accelerator also varies. Thus, accelerator rotor 30 receives force not only in the direction of rotation, but also in the direction of the support shaft, the radial direction of accelerator rotor 30, and the like, and the position shifts.

In the present embodiment, protruding portion 46 of sensor rotor 44 is sandwiched by the biasing force of plate spring 51 inserted into recess portion 30 of accelerator rotor 30. Even if the position of accelerator rotor 30 slides with respect to sensor rotor 44 in a direction other than the rotational direction by means of accelerator actuation, because position shift or deviation in accelerator rotor 30 is not transmitted, the degree of accelerator opening can be detected with a high degree of accuracy. In addition, because sensor rotor 44 is biased in the direction of support shaft 25 and toward accelerator rotor 30 by means of plate spring 50, even if accelerator rotor 30 changes position in the direction of the support shaft, sensor rotor 44 is prevented from sliding in the support shaft direction by means of both sliding resistance and an increase in biasing force in plate spring 50. In addition, because tapered surface 25a of support shaft 25 is pressed against tapered surface 45 of sensor rotor 44 by means of the biasing force of plate spring 50, sensor rotor 44 is protected against sliding in the support shaft 25 and orthogonal directions.

(Second Embodiment)

Figure 6:
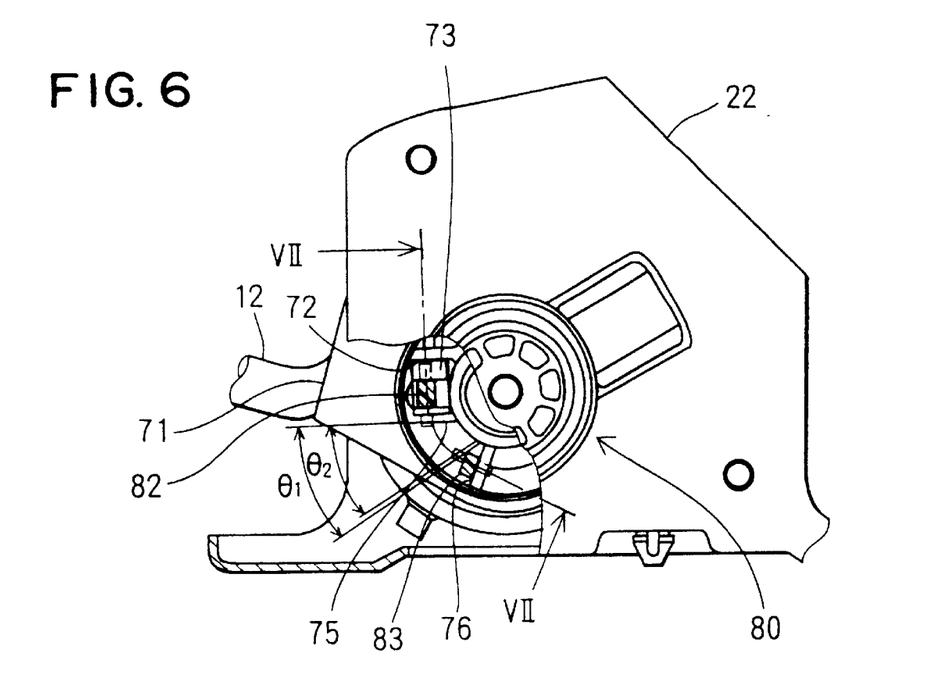
FIG. 6 is a sectional view of an accelerator device according to a second embodiment of the present invention.
Figure 7:
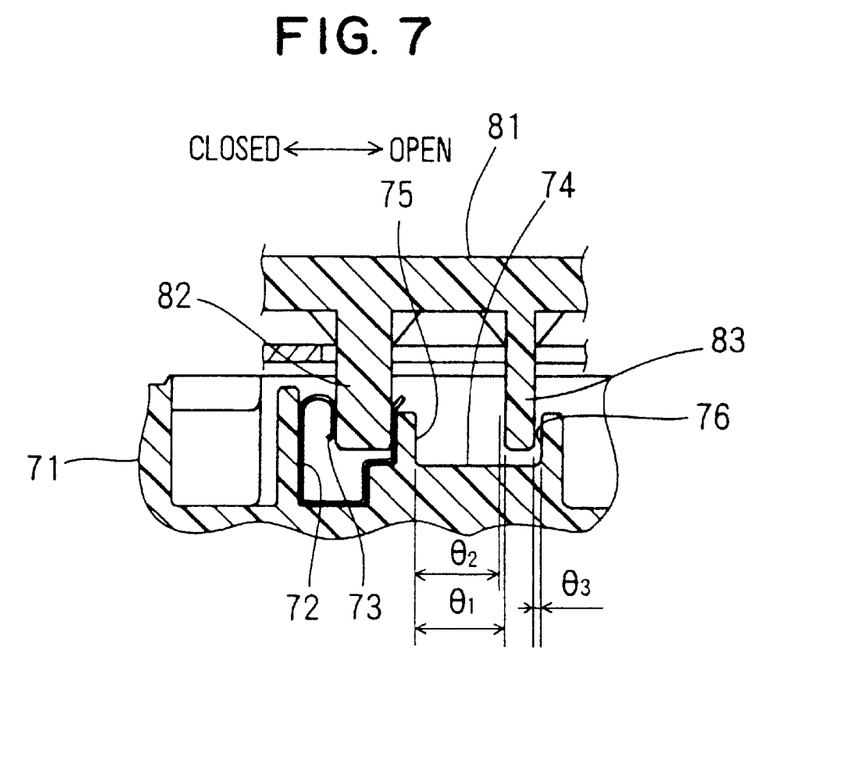
FIG. 7 is a cross-sectional view along line VII—VII of FIG. 6 of an accelerator device according to the present invention.

An accelerator device according to a second embodiment of the present invention is shown in FIG. 6 and FIG. 7. In the second embodiment, two recess portions 72 and 74 are formed in accelerator rotor 71, and two protruding portions 82 and 83 are formed in sensor rotor 81 of accelerator opening sensor 80. Other than this, the construction of this embodiment is essentially the same as the first embodiment.

Plate spring 73 is engaged in recess portion 72, and sandwiches protruding portion 82 in a direction opposite the direction of rotation. Thus, accelerator rotor 71 is prevented from shifting or deviating in the direction of rotation with respect to sensor rotor 81. A gap is formed between protruding portion 82 and plate spring 73 in the direction of support shaft 25 (support shaft 25 not shown in FIG. 7), and an aperture extends in the radial direction of accelerator rotor 71. Thus, with respect to sensor rotor 81, accelerator rotor 71 can remain in contact with plate spring 73 while sliding in the direction of support shaft 25 and the radial direction of accelerator rotor 71.

Protruding portion 83 is loosely inserted in recess portion 74 so that relative rotational movement is possible. As shown in FIG. 7, in the state in which protruding portion 82 receives biasing force from plate spring 73 in a direction opposite that of the direction of rotation, if the angle of rotation between accelerator closed end surface 75 of recess portion 74 and protruding member 83 is defined as $\theta 1$, the range of the angle of the accelerator rotational movement is defined as $\theta 2$, and the angle of rotation between accelerator open end surface 76 of recess portion 74 and protruding member 83 is defined as $\theta 3$, then $\theta 1$ is greater than $\theta 2$, and $\theta 2$ is greater than $\theta 3$. Only a small gap between protruding portion 83 and accelerator-open end face 76 is open, thus $\theta 3$ is small.

For example, when the accelerator pedal is pushed and the accelerator rotor 71 reaches the full open position, even if protruding portion 82 is damaged and the accelerator pedal is returned to the full closed position, because θ3 is small, protruding member 83 is engaged by accelerator open end surface 76 and sensor rotor 81 returns to the vicinity of the full closed position.

Figure 8:
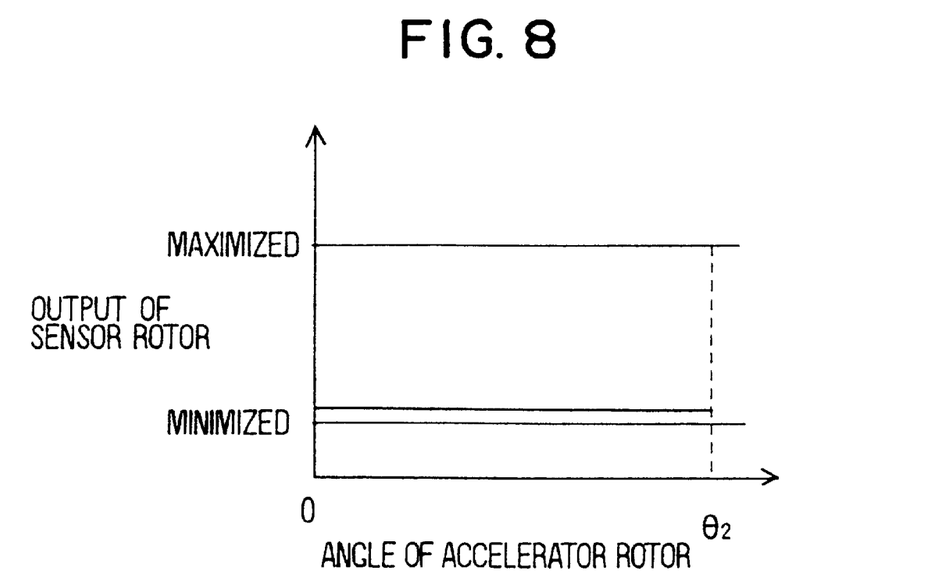
FIG. 8 is a graphical view showing the relationship between an angle of an accelerator rotor and an output of the sensor rotor for an accelerator device according to the present invention.

Next, even if the accelerator pedal is depressed from the full closed position, because θ1 is greater than θ2, accelerator closed end surface 75 will not contact with protruding member 83. Thus, even if protruding member 82 is damaged and the accelerator pedal momentarily returns to the full closed position, as shown in FIG. 8, the output of accelerator opening sensor 80 is not affected by the angle of accelerator rotor 71 and indicates that it is in the vicinity of the full closed position. By this means, sensor rotor 81 can be prevented from being stopped in the full open position.

(Third Embodiment)

Figure 9:
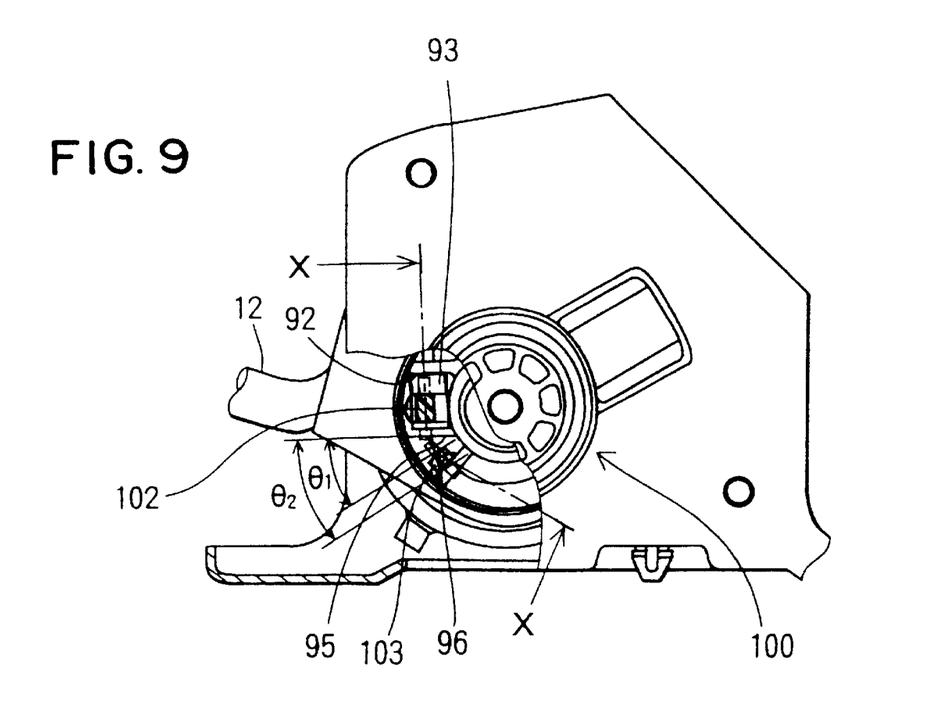
FIG. 9 is an auxiliary view of an accelerator device according to a third embodiment of the present invention.
Figure 10:
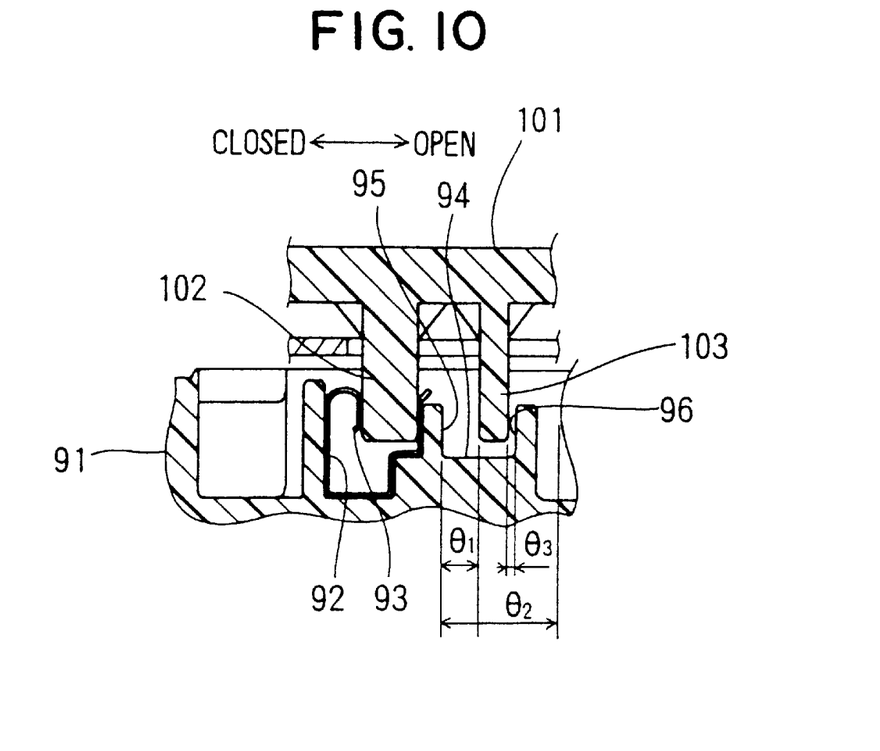
FIG. 10 is a cross-sectional view along line X—X of FIG. 9 for an accelerator device according to the present invention.

An accelerator device according to a third embodiment of the present invention is shown in FIG. 9 and FIG. 10. Other than the fact that the relative sizes of θ1 and θ2 are different in the second and third embodiments, the third embodiment is essentially the same as the second embodiment.

As shown in FIG. 10, in the state in which protruding portion 102 is engaged with recess portion 92 and receives biasing force from plate spring 93 in a direction opposite that of the direction of rotation, if the angle of rotation between accelerator-closed end face 95 of recess portion 94 and protruding portion 103 is defined as θ1, the range of the angle of accelerator rotational movement is defined as θ2, and the angle of rotation between accelerator open end surface 96 of recess portion 94 and protruding portion 103 is defined as θ3, then θ1 is less than θ2, and θ2 is greater than θ3. Only a small gap is open between protruding portion 103 and accelerator open end surface 96, and thus θ3 is small.

For example, when the accelerator pedal is depressed and the accelerator rotor reaches the full open position, even if protruding portion 102 is damaged and the accelerator pedal is returned to the full closed position, because θ3 is small, protruding member 103 is engaged by accelerator open end surface 96 and sensor rotor 101 returns to the vicinity of the full closed position.

Figure 11:
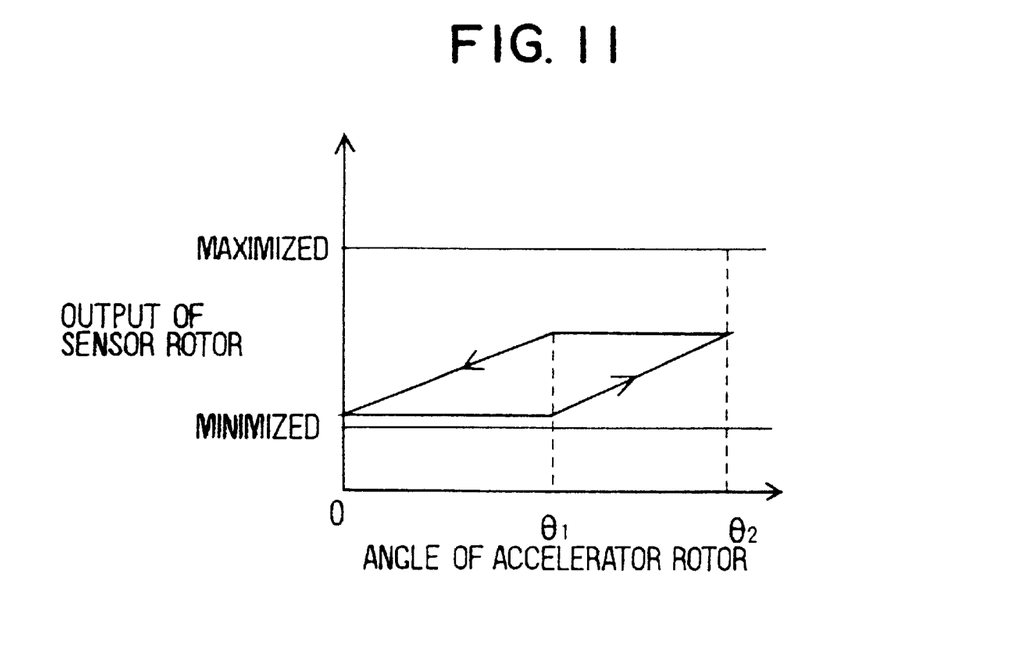
FIG. 11 is a graphical view showing the relationship between the angle of the accelerator rotor and the output of the sensor rotor of an accelerator device according to the present invention.

Next, because the accelerator pedal is depressed from the fully closed position, accelerator rotor 91 rotates up to the interval θ1, and protruding portion 103 does not contact with accelerator closed end surface 95, as shown in FIG. 11, the output of accelerator opening sensor 100 remains in the vicinity of the fully closed position. When accelerator 91 rotor rotates up to θ1, protruding member 103 comes in contact with accelerator closed end surface 95. In addition, when the accelerator pedal is depressed to the fully open position, sensor rotor 101 rotates together with accelerator rotor 91 (θ2−θ1). While the accelerator pedal returns from the fully open position to θ1, even though protruding portion 103 does not touch accelerator open end surface 96, the angle of sensor rotor 101 does not change, and the degree of accelerator opening detected by accelerator opening sensor 100 is certain. In addition, when the accelerator pedal returns to the closed position from θ1, protruding portion 103 is engaged by accelerator open end surface 96 and returns to the vicinity of the fully closed position.

Thus, in the interval in which the accelerator pedal is actuated from the fully closed position to the fully open position, accelerator opening sensor 100 outputs a detection signal between the vicinity of the fully closed position and the fully open position. Thus, even if protruding portion 102 is damaged, sensor rotor 101 can be prevented from stopping in the fully open position, and the vehicle can be safely operated.

In the second and third embodiments, recess portions are formed in the accelerator rotor, and protruding portions are formed in the sensor rotor. With respect to this, it is also acceptable if recess portions are formed in the sensor rotor, and protruding portions are formed in the accelerator rotor. In this case, the degree of rotation between the protruding portion and the accelerator open end surface in the recess portion that does not have a plate spring inserted therein is defined as θ1, the range of the angle of rotational movement of the accelerator rotor is defined as θ2, and the degree of rotation between the protruding portion and the accelerator closed end surface in the recess portion that does not have a plate spring inserted therein is defined as θ3. In addition, although two protruding portions are formed in the sensor rotor or accelerator rotor, it is also acceptable to have 3 or more formed therein. Finally, it is also acceptable to have one plate spring sandwich a plurality of protruding portions.

(Fourth Embodiment)

Figure 12:
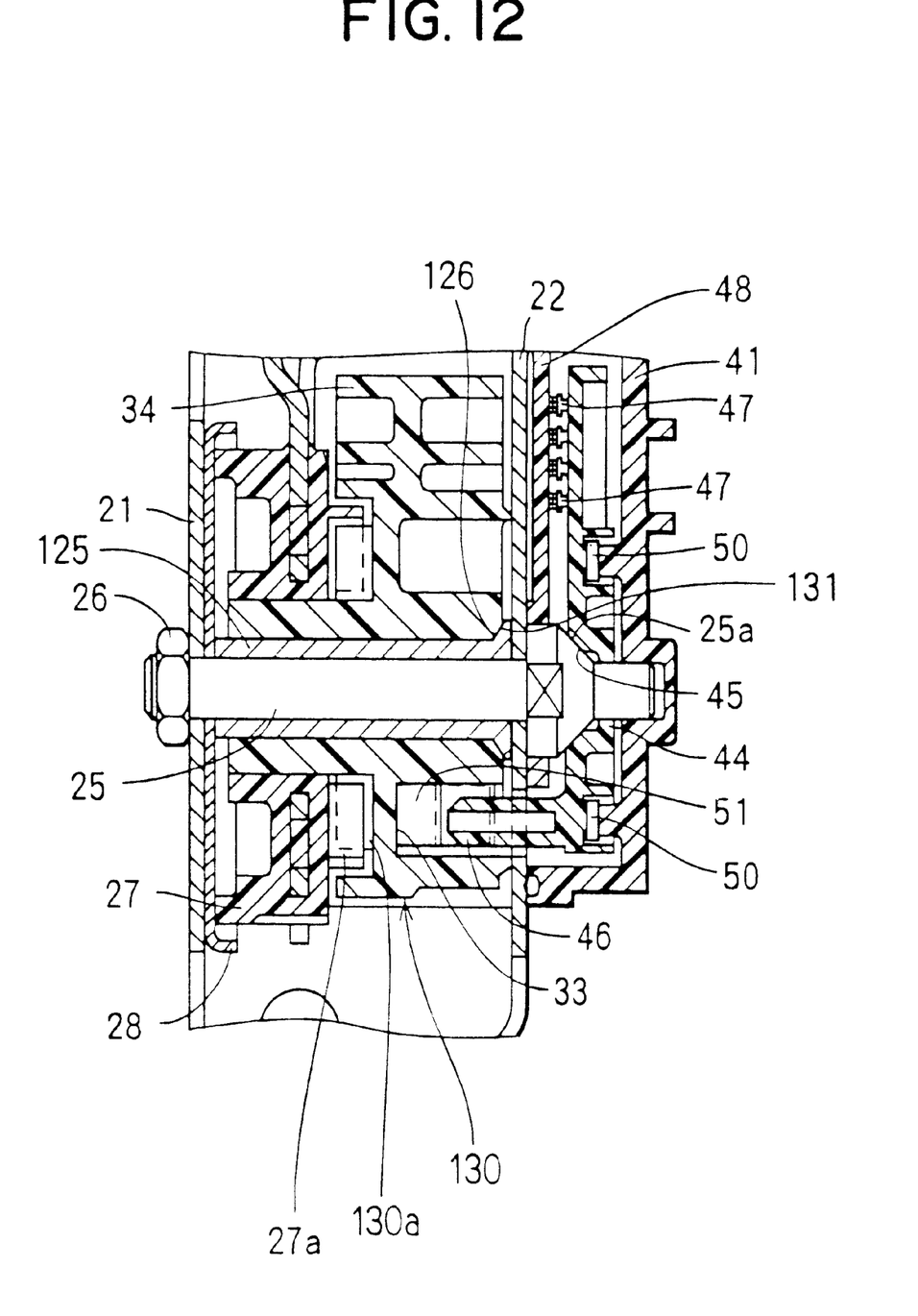
FIG. 12 is a cross-sectional view of an accelerator device according to a fourth embodiment of the present invention.

A fourth embodiment according to the present invention is shown in FIG. 12. The reference numerals used therein refer to essentially the same parts used in the first embodiment. A collar 125 is attached to the outer circumference of support shaft 120, and is tubular in shape. Collar 125 is sandwiched between bearing plate 22 and washer plate 28 by means of the fastening force of a nut 26, and is non-rotatable with respect to support shaft 120. Accelerator rotor 30 is attached to collar 125 such that it can rotate with, respect to it.

A cone-shaped convex surface 126 is formed on an end portion of collar 125 in the direction of support shaft 120. In addition, a cone-shaped concave surface 131 is formed on an end portion of accelerator rotor 130 attached to collar 125 in the direction of support shaft 120. The cone-shaped concave surface has approximately the same taper angle as cone-shaped convex surface 126. Diagonal teeth 27a of lever rotor 27 and diagonal teeth 130a of accelerator rotor 130 are engaged so that lever rotor 27 and accelerator rotor 130 can receive force in mutually separate directions. Diagonal teeth 27a and diagonal teeth 130a serve as a central axis biasing means. When accelerator rotor 130 rotates, cone-shaped concave surface 131 and cone-shaped convex surface 126 press against each other and slide in contact with each other due to the engagement of diagonal teeth 27a and diagonal teeth 130a. Thereupon, centripetal force acts on accelerator rotor 130, and prevents shift or deviation in the central axis of accelerator 130. Because there is no shift or deviation in the central axis of accelerator rotor 130, there is no shift or deviation in the central axis of sensor rotor 44. Thus, the degree of accelerator opening can be detected with a high degree of accuracy.

(Fifth Embodiment)

Figure 13:
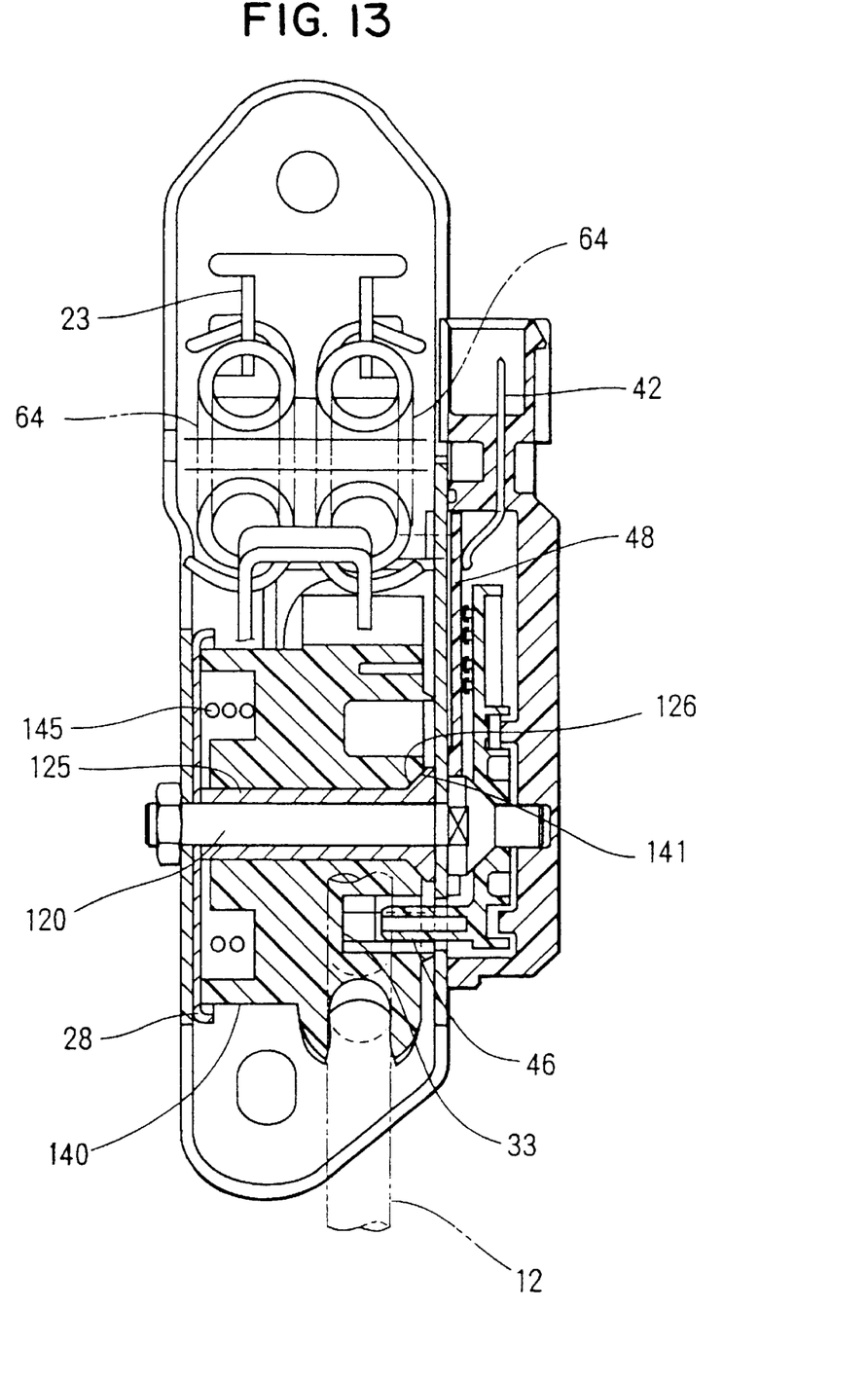
FIG. 13 is a cross-sectional view of an accelerator device according to a fifth embodiment of the present invention.

A fifth embodiment of the present invention is shown in FIG. 13. Accelerator rotor 140 is attached to collar 125 and can rotate. Cone-shaped convex surface 126 has approximately the same taper angle as cone-shaped concave surface 141, and is formed on an end portion of accelerator rotor 140 in the support shaft direction. Spring 145 serves as a central axis biasing means, and biases accelerator rotor 140 in the direction of contact with cone-shaped concave portion 141 and cone-shaped convex portion 126. Because the action of centripetal force on accelerator rotor 140 prevents shift or deviation in the central axis of accelerator rotor 140, there is no shift or deviation in the central axis of sensor rotor 44. Thus, the degree of accelerator opening can be detected with a high degree of accuracy.

In the fourth embodiment and fifth embodiment, the accelerator rotor and sensor rotor 44 are constructed such that they rotate together due to the engagement of protruding portion 46 and recess portion 33. With respect to this, it is acceptable if the accelerator rotor and the sensor rotor are fused together and formed into one body so that the accelerator rotor and the sensor rotor rotate together.

In addition, although cone-shaped convex surface 126 is formed in collar 125 and cone-shaped concave surface is formed in the accelerator rotor, it is acceptable if the cone-shaped concave surface is formed in the collar, and the cone-shaped convex surface is formed in the accelerator rotor. As a substitute for the cone-shaped convex surface, a pyramid-shaped convex surface may be contacted with a cone-shaped concave surface.

In the plurality of embodiments of the present invention described above, the accelerator rotor and the sensor rotor are fixed onto the same support shaft and can rotate. Thus, the accelerator device can be made small. In addition, in comparison to where the accelerator rotor and sensor rotor are on different rotational axes, because alignment is not necessary and the number of parts is reduced, assembly is made easy. In addition, because the rate of change of the accelerator rotor and the rate of change of the sensor rotor accompanying the rotational movement of the accelerator rotor are in unison, the degree of accelerator opening can be detected with a high degree of accuracy.

Further, the level of accelerator actuation is transmitted to the sensor rotor due to the fact that the support shaft does not rotate and the accelerator rotor and the sensor rotor are engaged. In addition, because the accelerator rotor can slide in the direction of the support shaft and the radial direction of the accelerator rotor, even if the accelerator actuation accompanying the accelerator rotor slides in a direction other than the direction of rotation, shift or deviation in the accelerator rotor is not transmitted to the sensor rotor. Thus, especially as in the present embodiments, with the contact portions attached to the sensor rotor that slide in contact with the resistor-coated substrate, shift or deviation in the sliding pressure between the contact portions and the substrate and shift or deviation in the position of the contact portions is prevented, and the degree of accelerator opening can be detected with a high degree of accuracy.

Further, instead of inserting a plate spring in the recess portion formed in the accelerator rotor, it is acceptable that a small a gap as possible is formed in the direction of rotation between the protruding portion formed in the sensor rotor and the recess portion formed in the accelerator rotor, so that the protruding portion does not rotate with respect to the recess portion and the level of accelerator actuation is transmitted to the sensor rotor.

In the first embodiment, fourth embodiment and fifth embodiment, a recess portion is formed in the accelerator rotor, and a protruding portion formed in the sensor rotor receives biasing force in the direction of rotation from a plate spring engaged in the recess portion. However, it is acceptable for a protruding member to be formed on the accelerator rotor, and a recess portion to be formed in the sensor rotor.

While the above-described embodiments refer to examples of usage of the present invention, it is understood that the present invention may be applied to other usage, modifications and variations of the same, and is not limited to the disclosure provided herein.

What is claimed is:

1. An accelerator device, comprising:
   an accelerator member operated by a driver, wherein an accelerator pedal and a pedal arm constitute said accelerator member;
   a support member pivotably connected to said accelerator member;
   a support shaft fixed to said support member, wherein said support shaft is non-rotatable;
   an accelerator rotor rotationally attached to said support shaft, the combination of said accelerator rotor and said accelerator member rotating according to an amount of actuation of said accelerator member;
   an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and
   an accelerator biasing means, said accelerator biasing means biasing said accelerator member in a direction of actuation of said accelerator member and in an opposite direction, wherein said support shaft supports said accelerator member, said accelerator rotor, and said sensor rotor.

2. The accelerator device according to claim 1, wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor.

3. The accelerator device according to claim 2, wherein:
   a recess portion is disposed in said accelerator rotor or said sensor rotor;
   a protruding portion is disposed on said accelerator rotor or said sensor rotor that does not have said recess portion disposed therein, said protruding portion engaged with said recess portion and receiving biasing force in the rotational direction from a plate spring inserted into said recess portion.

4. The accelerator device according to claim 3, wherein a plurality of recess portions are disposed in said accelerator rotor or said sensor rotor, a plurality of protruding portions are formed on said accelerator rotor or said sensor rotor not having said recess portions, at least one of said protruding portions are engaged with said recess portions and receives biasing force in the rotational direction from a plate spring inserted into at least one of said recess portions.

5. The accelerator device according to claim 2, wherein said protruding portions are disposed on said sensor rotor, said recess portions are disposed in said accelerator rotor, either at least one of said protruding portions receives biasing force in a rotational direction from a plate spring inserted in said recess portion or at least one of said protruding members cannot move in the rotational direction in the engaged state with said recess portions that do not have a plate spring inserted therein, or $\theta 1 > \theta 2$ and $\theta 2 > \theta 3$, wherein $\theta 1$ is a rotational angle of the gap formed in the rotational direction between said protruding member and the accelerator closed end surface of the recess portion, $\theta 2$ is a range of the angle of the rotational movement of said accelerator rotor, and $\theta 3$ is a rotational angle between said protruding portion and the accelerator open end surface of said recess portions that do not have a plate spring inserted therein.

6. The accelerator device according to claim 2, wherein said protruding portions are disposed on said sensor rotor, said recess portions are disposed in said accelerator rotor, either at least one of said protruding portions receive biasing force in the rotational direction from a plate spring inserted in said recess portions or at least one of said protruding members does not move in the rotational direction in the engaged state with said recess portions that do not have a plate spring inserted therein, or $\theta1<\theta2$ and $\theta2>\theta3$, wherein $\theta1$ is a rotational angle of a gap formed in the rotational direction between said protruding member and the accelerator closed end surface of the recess portion, $\theta2$ is a range of an angle of rotational movement of said accelerator rotor, and $\theta3$ is an rotational angle between said protruding portion and the accelerator open end surface of said recess portions that do not have a plate spring inserted therein.

7. The accelerator device according to claim 2, wherein either said protruding portions are disposed in said accelerator rotor, said recess portions are disposed in said sensor rotor, and at least one of said protruding portions receives biasing force in the rotational direction from a plate spring inserted in said recess portions, or at least one of said protruding members cannot move in the rotational direction in the engaged state with said recess portions that do not have a plate spring inserted therein, or $\theta1>\theta2$ and $\theta2>\theta3$, wherein $\theta1$ is a rotational angle of a gap formed in a rotational direction between said protruding member and an accelerator open end surface of the recess portion, $\theta2$ is defined as a range of an angle of rotational movement of said accelerator rotor, and $\theta3$ is defined as a rotational angle between said protruding portion and an accelerator closed end surface of said recess portions that do not have a plate spring inserted therein.

8. The accelerator device according to claim 2, wherein, said protruding portions are disposed in said accelerator rotor, said recess portions are disposed in said sensor rotor, either at least one of said protruding portions receive biasing force in the rotational direction from a plate spring inserted in said recess portions, or at least one of said protruding members cannot move in the rotational direction in an engaged state with said recess portions that do not have a plate spring inserted therein, or $\theta1$, $\theta2$ and $\theta2>\theta3$, wherein $\theta3$, is a rotational angle of a gap formed in a rotational direction between said protruding member and an accelerator open end surface of the recess portion, $\theta2$ is defined as a range of an angle of rotational movement of said accelerator rotor, and $\theta3$ is defined as a rotational angle between said protruding portion and an accelerator closed end surface of said recess portions that do not have a plate spring inserted therein.

9. An accelerator device, comprising:
an accelerator member operated by a driver, wherein an accelerator pedal and a pedal arm constitute said accelerator member;
a support member;
a support shaft fixed to said support member;
a tubular member attached to an outer periphery of said support shaft;
an accelerator rotor rotationally attached to said support shaft, the combination of said accelerator rotor and said accelerator member rotating according to an amount of actuation of said accelerator member;
an accelerator opening sensor having a sensor rotor rotationally attached to said support shaft, said sensor rotor rotationally moving with said accelerator rotor, said accelerator opening sensor detecting a degree of accelerator opening from the position of the rotational angle of said sensor rotor; and
an accelerator biasing means biasing said accelerator member in a direction of actuation of said accelerator member and in an opposite direction;
wherein said accelerator rotor has a cone-shaped concave surface, and a central axis biasing means biasing said accelerator rotor such that said cone-shaped concave portion is brought in contact with a cone-shaped convex surface.

10. An accelerator device according to claim 1, further comprising a sensor biasing means for biasing said sensor rotor in one direction of said support shaft.

11. An accelerator device according to claim 10, a taper surface formed in said support shaft that engages with said sensor rotor.

12. An accelerator device, comprising:
an accelerator member operated by a driver, wherein an accelerator pedal and a pedal arm constitute said accelerator member;
a support member pivotably connected to said accelerator member;
a support shaft fixed to said support member;
an accelerator rotor rotationally attached to said support shaft, the combination of said accelerator rotor and said accelerator member rotating according to an amount of actuation of said accelerator member;
an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and
an accelerator biasing means, said accelerator biasing means biasing said accelerator member in a direction of actuation of said accelerator member and in an opposite direction,
wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor,
wherein a recess portion is disposed in said accelerator rotor or said sensor rotor;
a protruding portion is disposed on said accelerator rotor or said sensor rotor that does not have said recess portion disposed therein, said protruding portion engaged with said recess portion and receiving biasing force in the rotational direction from a plate spring inserted into said recess portion,
wherein a plurality of recess portions are disposed in said accelerator rotor or said sensor rotor, a plurality of protruding portions are formed on said accelerator rotor or said sensor rotor not having said recess portions, at least one of said protruding portions are engaged with said recess portions and receives biasing force in the rotational direction from a plate spring inserted into at least one of said recess portions.

13. An accelerator device, comprising:
an accelerator member operated by a driver, wherein an accelerator pedal and a pedal arm constitute said accelerator member;

a support member pivotably connected to said accelerator member;

a support shaft fixed to said support member;

an accelerator rotor rotationally attached to said support shaft, the combination of said accelerator rotor and said accelerator member rotating according to an amount of actuation of said accelerator member;

an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and an accelerator biasing means, said accelerator biasing means biasing said accelerator member in a direction of actuation of said accelerator member and in an opposite direction, wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor, wherein said protruding portions are disposed on said sensor rotor, said recess portions are disposed in said accelerator rotor, either at least one of said protruding portions receives biasing force in a rotational direction from a plate spring inserted in said recess portion or at least one of said protruding members cannot move in the rotational direction in the engaged state with said recess portions that do not have a plate spring inserted therein, or $\theta1>\theta2$ and $\theta2>\theta3$, wherein $\theta1$ is a rotational angle of the gap formed in the rotational direction between said protruding member and the accelerator closed end surface of the recess portion, $\theta2$ is a range of the angle of the rotational movement of said accelerator rotor, and $\theta3$ is a rotational angle between said protruding portion and the accelerator open end surface of said recess portions that do not have a plate spring inserted therein.

14. An accelerator device, comprising:

an accelerator member operated by a driver, wherein an accelerator pedal and a pedal arm constitute said accelerator member;

a support member pivotably connected to said accelerator member;

a support shaft fixed to said support member;

an accelerator rotor rotationally attached to said support shaft, the combination of said accelerator rotor and said accelerator member rotating according to an amount of actuation of said accelerator member;

an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and an accelerator biasing means, said accelerator biasing means biasing said accelerator member in a direction of actuation of said accelerator member and in an opposite direction, wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor, wherein said protruding portions are disposed on said sensor rotor, said recess portions are disposed in said accelerator rotor, either at least one of said protruding portions receive biasing force in the rotational direction from a plate spring inserted in said recess portions or at least one of said protruding members does not move in the rotational direction in the engaged state with said recess portions that do not have a plate spring inserted therein, or $\theta1<\theta2$ and $\theta2>\theta3$, wherein $\theta1$ is a rotational angle of a gap formed in the rotational direction between said protruding member and the accelerator closed end surface of the recess portion, $\theta2$ is a range of an angle of rotational movement of said accelerator rotor, and $\theta3$ is an rotational angle between said protruding portion and the accelerator open end surface of said recess portions that do not have a plate spring inserted therein.

15. An accelerator device, comprising:

an accelerator member operated by a driver, wherein an accelerator pedal and a pedal arm constitute said accelerator member;

a support member pivotably connected to said accelerator member;

a support shaft fixed to said support member;

an accelerator rotor rotationally attached to said support shaft, the combination of said accelerator rotor and said accelerator member rotating according to an amount of actuation of said accelerator member;

an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and an accelerator biasing means, said accelerator biasing means biasing said accelerator member in a direction of actuation of said accelerator member and in an opposite direction, wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor, wherein either said protruding portions are disposed in said accelerator rotor, said recess portions are disposed in said sensor rotor, and at least one of said protruding portions receives biasing force in the rotational direction from a plate spring inserted in said recess portions, or at least one of said protruding members cannot move in the rotational direction in the engaged state with said recess portions that do not have a plate spring inserted therein, or $\theta1>\theta2$ and $\theta2>\theta3$, wherein $\theta1$ is a rotational angle of a gap formed in a rotational direction between said protruding member and an accelerator open end surface of the recess portion, $\theta2$ is defined as a range of an angle of rotational movement of said accelerator rotor, and $\theta3$ is defined as an rotational angle between said protruding portion and an accelerator closed end surface of said recess portions that do not have a plate spring inserted therein.

16. An accelerator device, comprising:

an accelerator member operated by a driver, wherein an accelerator pedal and a pedal arm constitute said accelerator member;

a support member pivotably connected to said accelerator member;

a support shaft fixed to said support member;

an accelerator rotor rotationally attached to said support shaft, the combination of said accelerator rotor and said accelerator member rotating according to an amount of actuation of said accelerator member;

an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and an accelerator biasing means, said accelerator biasing means biasing said accelerator member in a direction of actuation of said accelerator member and in an opposite direction, wherein said accelerator rotor is prevented from shifting in a rotational direction with respect to said sensor rotor, said accelerator rotor being engaged with said sensor rotor such that said accelerator rotor slides while in contact with said sensor rotor in a direction of said support shaft and a radial direction of said accelerator rotor, wherein said protruding portions are disposed in said accelerator rotor, said recess portions are disposed in said sensor rotor, either at least one of said protruding portions receive biasing force in the rotational direction from a plate spring inserted in said recess portions, or at least one of said protruding members cannot move in the rotational direction in an engaged state with said recess portions that do not have a plate spring inserted therein, or $\theta 1 < \theta 2$ and $\theta 2 > \theta 3$, wherein $\theta 1$ is a rotational angle of a gap formed in a rotational direction between said protruding member and an accelerator open end surface of the recess portion, $\theta 2$ is defined as a range of an angle of rotational movement of said accelerator rotor, and $\theta 3$ is defined as a rotational angle between said protruding portion and an accelerator closed end surface of said recess portions that do not have a plate spring inserted therein.

17. An accelerator device, comprising:

an accelerator member operated by a driver, wherein an accelerator pedal and a pedal arm constitute said accelerator member;

a support member pivotably connected to said accelerator member;

a support shaft fixed to said support member;

an accelerator rotor rotationally attached to said support shaft, the combination of said accelerator rotor and said accelerator member rotating according to an amount of actuation of said accelerator member;

an accelerator opening sensor having a sensor rotor rotationally attached to said support shaft, said sensor rotor engaged with said accelerator rotor and rotationally moving together with said accelerator rotor, said accelerator opening sensor detecting a degree of accelerator opening by means of a position of a rotational angle of said sensor rotor; and an accelerator biasing means, said accelerator biasing means biasing said accelerator member in a direction of actuation of said accelerator member and in an opposite direction, wherein the support shaft has a first support portion on which the sensor rotor is supported in a slidable manner, the sensor rotor has a second support portion which is supported on the first support portion of the support shaft, a taper surface which is tapered with respect to a rotational axis of the sensor rotor is formed on at least one of the first and second support portions, and a sensor biasing member disposed to bias the sensor rotor in a direction in which the second support portion is pushed against the first support portion so that the sensor rotor is guided and maintained on the rotational axis.

* * * * *